(12) United States Patent
Wang et al.

(10) Patent No.: US 11,743,441 B2
(45) Date of Patent: Aug. 29, 2023

(54) METHODS AND APPARATUS FOR SELECTING AND SWITCHING INPUT VIDEO TRACKS USING TRACK DERIVATIONS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/461,031

(22) Filed: Aug. 30, 2021

(65) Prior Publication Data

US 2022/0070429 A1   Mar. 3, 2022

Related U.S. Application Data

(60) Provisional application No. 63/081,949, filed on Sep. 23, 2020, provisional application No. 63/072,275, filed on Aug. 31, 2020.

(51) Int. Cl.
*H04N 13/161* (2018.01)
*H04N 13/106* (2018.01)
(Continued)

(52) U.S. Cl.
CPC ......... *H04N 13/158* (2018.05); *G06T 3/0062* (2013.01); *G06T 15/20* (2013.01); *H04N 13/161* (2018.05); *H04N 13/178* (2018.05)

(58) Field of Classification Search
None
See application file for complete search history.

(56) References Cited

U.S. PATENT DOCUMENTS

| 2012/0016917 A1* | 1/2012 | Priddle ............... H04N 21/433 |
| | | 707/E17.143 |
| 2020/0245041 A1* | 7/2020 | Maze ................. H04N 21/8133 |
| 2020/0389676 A1* | 12/2020 | Denoual .......... H04N 21/85406 |

FOREIGN PATENT DOCUMENTS

| CN | 107534801 A | 1/2018 |
| CN | 110506423 A | 11/2019 |

OTHER PUBLICATIONS

No Author Listed, Information technology—JPEG 2000 image coding system—Part 12: ISO base media file format. ISO/IEC 14496/15444-12:2015(E). Feb. 20, 2015:293 pages.

(Continued)

*Primary Examiner* — Patrick F Valdez
(74) *Attorney, Agent, or Firm* — Wolf, Greenfield & Sacks, P.C.

(57) ABSTRACT

The techniques described herein relate to methods, apparatus, and computer readable media configured to accessing multimedia data that includes a plurality of media tracks that each include an associated series of samples of media data, and a derived track comprising a set of derivation operations to perform to generate a series of samples of media data for the derived track. A derivation operation of the set is performed to generate a portion of media data for the derived track, which includes: determining, based on the derivation operation, a group of media tracks from the plurality by determining each media track in the group meets a grouping criteria, selecting one media track from the group of media tracks, and adding a sample from the one media track to the derived track to generate the portion of the derived track.

17 Claims, 12 Drawing Sheets

200

(51) Int. Cl.
  *H04N 13/178* (2018.01)
  *G06T 15/20* (2011.01)
  *G06T 3/00* (2006.01)

(56) References Cited

OTHER PUBLICATIONS

No Author Listed, Text of ISO/IEC FDIS 23009-1 4$^{th}$ Edition. Information technology—Dynamic adaptive streaming over HTTP (DASH)—Part 1: Media presentation description and segment formats. ISO/IEC FDIS 23009-1:201x(E). N18609. Aug. 12, 2019:287 pages.

No Author Listed, Information technology—MPEG systems technologies—Part 12: Image File Format. ISO/IEC FDIS 23008-12 2$^{nd}$ Edition. MPEG N18310. Jun. 26, 2015:87 pages.

No Author Listed, Information technology—Dynamic adaptive streaming over HTTP (DASH)—Part 5: Server and network assisted DASH (SAND). ISO/IEC FDIS 23009-5:2015(E) N15991. Feb. 19, 2015:56 pages.

No Author Listed, Text of ISO/IEC FDIS 23090-8 Network-based Media Processing, Information technology—Coded representation of immersive media—Part 8: Network Based Media Processing. ISO/IEC JTC1/SC 29/WG 11. ISO 23090-8:2020(E). N19062. Jan. 2020:131 pages.

Mazè et al., Revised text of ISO/IEC CD 23001-16 Derived visual tracks in the ISO base media file format. International Organisation for Standardisation, ISO/IEC JTC1/SC29/WG11 Coding of Moving Pictures and Audio. N19428. Jun. 2020:22 pages.

Mazè, Technologies under Consideration on ISO/IEC 23001-16. International Organisation for Standardisation, ISO/IEC JTC 1/SC29/WG 11 Coding of Moving Pictures and Audio. N19450. Jul. 2020:17 pages.

Wang et al., Deriving Composite Tracks in ISOBMFF. International Organisation for Standardisation, ISO/IEC JTC 1/SC/WG 11 Coding of Moving Pictures and Audio. MPEG2016/M39971. Jan. 2017:9 pages.

Wang et al., Track Derivations for Track Selection and Switching in ISOBMFF. International Organisation for Standardisation, ISO/IEC JTC1/SC29/WG11 Coding of Moving Pictures and Audio. MPEG 2020/M54876. Oct. 2020:11 pages.

\* cited by examiner

```
aligned(8) class TrackHeaderBox
extends FullBox ('tkhd', version, flags) {
if (version==1) {
    unsigned int (64) creation_time;
    unsigned int (64) modification_time;
    unsigned int (32) track_ID;
    const unsigned int(32) reserved = 0;
    unsigned int(64) duration;
} else { // version == 0
    unsigned int (32) creation_time;
    unsigned int (32) modification_time;
    unsigned int (32) track_ID;
    const unsigned int(32) reserved = 0;
    unsigned int(32) duration;
}
const unsigned int(32)[2] reserved = 0;
template int(16) layer = 0;
template int(16) alternate_group=0;
...
}
```

FIG. 6

```
aligned(8) class AlternateGroupSelection
extends VisualDerivationBase ('atgs', flags) {
    unsigned int (32) attribute_list[];
}
```

802 → (class AlternateGroupSelection)
804 → (attribute_list)
800 → (box)

FIG. 8

```
aligned(8) class AlternateGroupSelection1
extends VisualDerivationBase ('ats1', flags) {
    unsigned int (32) attribute_list[];
}
```

```
aligned(8) class SwitchGroupSelection1
extends VisualDerivationBase ('sgs1', flags) {
    template int(32) switch_group;
    unsigned int (32) attribute_list[];
}
```

FIG. 11

METHODS AND APPARATUS FOR SELECTING AND SWITCHING INPUT VIDEO TRACKS USING TRACK DERIVATIONS

RELATED APPLICATIONS

This Application claims priority under 35 U.S.C. § 119(e) to U.S. Provisional Application No. 63/072,275, filed Aug. 31, 2020, and entitled "METHODS OF TRACK DERIVATION FOR TRACK SELECTION AND SWITCHING IN ISOBMFF," and to U.S. Provisional Application No. 63/081,949, filed Sep. 23, 2020, and entitled "METHODS OF TRACK DERIVATIONS FOR TRACK SELECTION AND SWITCHING WITH SINGLE INPUT TRACKS IN ISOBMFF," each of which are hereby incorporated by reference herein in their entirety.

TECHNICAL FIELD

The techniques described herein relate generally to selecting and switching input video tracks, including selecting and switching between single input video tracks in the ISO Base Media File Format (ISOBMFF).

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for selecting and switching between input video tracks using a track derivation process, such as input tracks to a track derivation operation in ISOBMFF.

Some embodiments relate to a method implemented by at least one processor in communication with a memory, wherein the memory stores computer-readable instructions that, when executed by the at least one processor, cause the at least one processor to perform accessing multimedia data comprising (a) a plurality of media tracks, each media track comprising an associated series of samples of media data and (b) a derived track comprising a set of derivation operations to perform to generate a series of samples of media data for the derived track, performing a derivation operation of the set of derivation operations to generate a portion of media data for the derived track, comprising: determining, based on the derivation operation, a group of media tracks from the plurality of media tracks, comprising determining each media track in the group of tracks meets a grouping criteria, wherein the group of media tracks is a subset of the plurality of media tracks; selecting one media track from the group of media tracks; and adding a sample from the one media track to the derived track to generate the portion of the derived track.

In some examples, the grouping criteria comprises an alternate group value, and determining each media track in the group of tracks meets the grouping criteria comprises determining each media track in the group of tracks comprises an alternate group equal to the alternate group value.

In some examples, the grouping criteria comprises a switch group value, and determining each media track in the group of tracks meets the grouping criteria comprises determining each media track in the group of tracks comprises a switch group equal to the switch group value.

In some examples, selecting one media track from the group of media tracks comprises determining, based on the derivation operation, an attribute list comprising one or more attributes, and selecting the one media track by determining the one media track meets each of the one or more attributes of the attribute list.

In some examples, the group of media tracks are inputs to the derivation operation, and the portion of the derived track is an output of the derivation operation.

In some examples, a representative track is an input to the derivation operation, wherein the representative track is used to determine the grouping criteria, and the portion of the derived track is an output of the derivation operation.

In some examples, the at least one processor is configured to perform each derivation operation of the set of derivation operations to select media samples from the plurality of media tracks to generate the derived track with the selected media samples.

Some embodiments relate to an apparatus comprising a processor in communication with memory, the processor being configured to execute instructions stored in the memory that cause the processor to perform: accessing multimedia data comprising (a) a plurality of media tracks, each media track comprising an associated series of samples of media data, and (b) a derived track comprising a set of derivation operations to perform to generate a series of samples of media data for the derived track, and perform a derivation operation of the set of derivation operations to generate a portion of media data for the derived track, comprising: determining, based on the derivation operation, a group of media tracks from the plurality of media tracks, comprising determining each media track in the group of tracks meets a grouping criteria, wherein the group of media tracks is a subset of the plurality of media tracks; selecting one media track from the group of media tracks; and adding a sample from the one media track to the derived track to generate the portion of the derived track.

In some examples, the grouping criteria comprises an alternate group value, and determining each media track in the group of tracks meets the grouping criteria comprises determining each media track in the group of tracks comprises an alternate group equal to the alternate group value.

In some examples, the grouping criteria comprises a switch group value, and determining each media track in the group of tracks meets the grouping criteria comprises determining each media track in the group of tracks comprises a switch group equal to the switch group value.

In some examples, selecting one media track from the group of media tracks comprises determining, based on the derivation operation, an attribute list comprising one or more attributes, and selecting the one media track by determining the one media track meets each of the one or more attributes of the attribute list.

In some examples, the group of media tracks are inputs to the derivation operation, and the portion of the derived track is an output of the derivation operation.

In some examples, a representative track is an input to the derivation operation, wherein the representative track is used to determine the grouping criteria, and the portion of the derived track is an output of the derivation operation.

In some examples, the instructions cause the processor to perform each derivation operation of the set of derivation operations to select media samples from the plurality of media tracks to generate the derived track with the selected media samples.

Some embodiments relate to an apparatus comprising a processor in communication with a memory, the processor being configured to execute instructions stored in the memory that cause the processor to perform encoding multimedia data comprising (a) a plurality of media tracks, each media track comprising an associated series of samples of media data, and (b) a derived track comprising a set of derivation operations to perform to generate a series of samples of media data for the derived track, wherein a derivation operation of the set of derivation operations provides for generating a portion of media data for the derived track by: determining, based on the derivation operation, a group of media tracks from the plurality of media tracks, comprising determining each media track in the group of tracks meets a grouping criteria, wherein the group of media tracks is a subset of the plurality of media tracks; selecting one media track from the group of media tracks; and adding a sample from the one media track to the derived track to generate the portion of the derived track.

In some examples, the grouping criteria comprises an alternate group value, and determining each media track in the group of tracks meets the grouping criteria comprises determining each media track in the group of tracks comprises an alternate group equal to the alternate group value.

In some examples, the grouping criteria comprises a switch group value, and determining each media track in the group of tracks meets the grouping criteria comprises determining each media track in the group of tracks comprises a switch group equal to the switch group value.

In some examples, the derivation operation comprises an attribute list comprising one or more attributes, and selecting one media track from the group of media tracks comprises selecting the one media track by determining the one media track meets each of the one or more attributes of the attribute list.

In some examples, the group of media tracks are inputs to the derivation operation, and the portion of the derived track is an output of the derivation operation.

In some examples, a representative track is an input to the derivation operation, wherein the representative track is used to determine the grouping criteria, and the portion of the derived track is an output of the derivation operation.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 6 shows an exemplary syntax for a track header box, according to some examples.

FIG. 8 shows an exemplary syntax for an alternate group selection transformation property, according to some embodiments.

FIG. 10 shows an exemplary syntax for the alternate group selection one transformation property, according to some embodiments.

FIG. 11 shows an exemplary syntax for the switch group selection one transformation property, according to some embodiments.

DETAILED DESCRIPTION OF INVENTION

Figure 1:
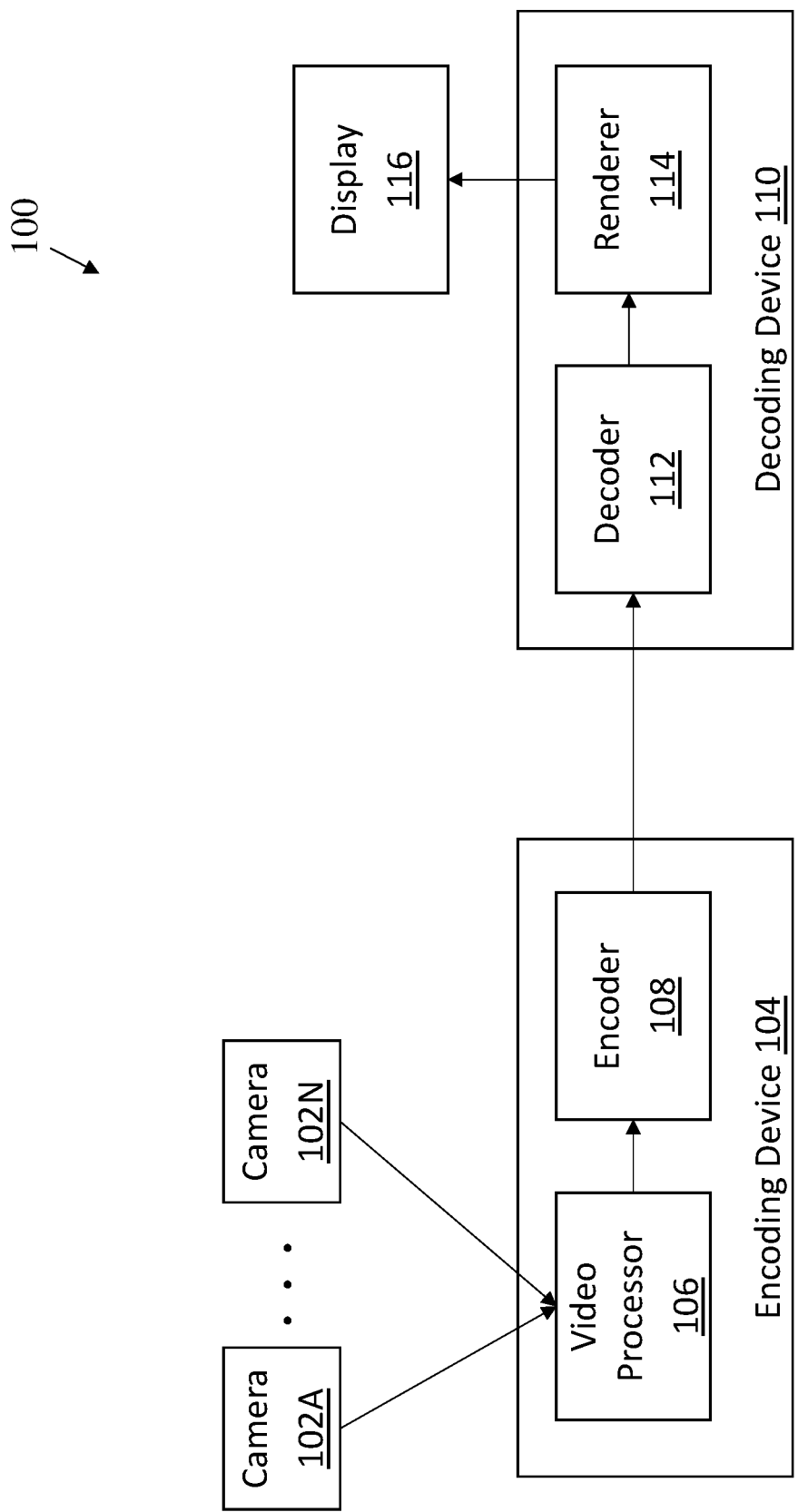
FIG. 1 shows an exemplary video coding configuration, according to some embodiments.

The ISO Base Media File Format (ISOBMFF) provides for track derivations in which generally one or more input tracks are processed to generate an output/derived track. However, the inventors have appreciated that deficiencies exist in conventional approaches. In particular, deficiencies exist with conventional approaches used to select a track from among a group of tracks. For example, while some conventional approaches can provide for selecting one track from a group of tracks, such approaches cannot be performed using a track derivation operation. Rather, such approaches are performed transiently during streaming or playback. Therefore, for example, it is not possible using conventional approaches to associate other tracks (e.g., metadata or audio tracks) to a selected or switched track. Further, such approaches simply select tracks at the track level, and thus select all associated samples of the track without providing any way to select content at the sample level instead of the track level. As a result, conventional approaches do not provide for specifying or generating a new track resulting from track selection or track switching (e.g., a new track with a different track ID than the tracks being selected or switched from). Therefore, such conventional approaches cannot be used to generate a single encapsulated track with samples from one or more input tracks as specified by transformation operations at the sample level in a derived track. As another example, while some conventional approaches provide for composition transform properties, such transformation properties do not provide for specifying any selection criteria among input tracks. Further, such composition operations include placement parameters that are used to relocate and scale the selected content, which may not be needed and/or desirable (e.g., due to the additional overhead in the operations and with the associated metadata required for the operations).

The techniques described herein address these and other deficiencies by providing transformation operations for track derivation operations that can be used to perform track selection and track switching at the sample level (e.g., not the track level). As described herein, a number of input tracks can be processed by track selection derivation operations to select samples from one of the input tracks at the sample level to generate the media samples of the output track. Accordingly, the selection-based track derivation techniques described herein allow for the selection of samples from a track in a group of tracks at the time of the derivation operation. In some embodiments, the selection-based track derivation can provide for a track encapsulation of track samples as the output from the derivation operation (s) of a derived track, where the track samples are selected or switched from a group of tracks. Such a track encapsulation is not provided for by conventional track selection mechanisms. As a result, a track selection derivation operation can provide samples from any of the input tracks to the derivation operation as specified by the transformations of the derived track to generate the resulting track encapsulation of the samples.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
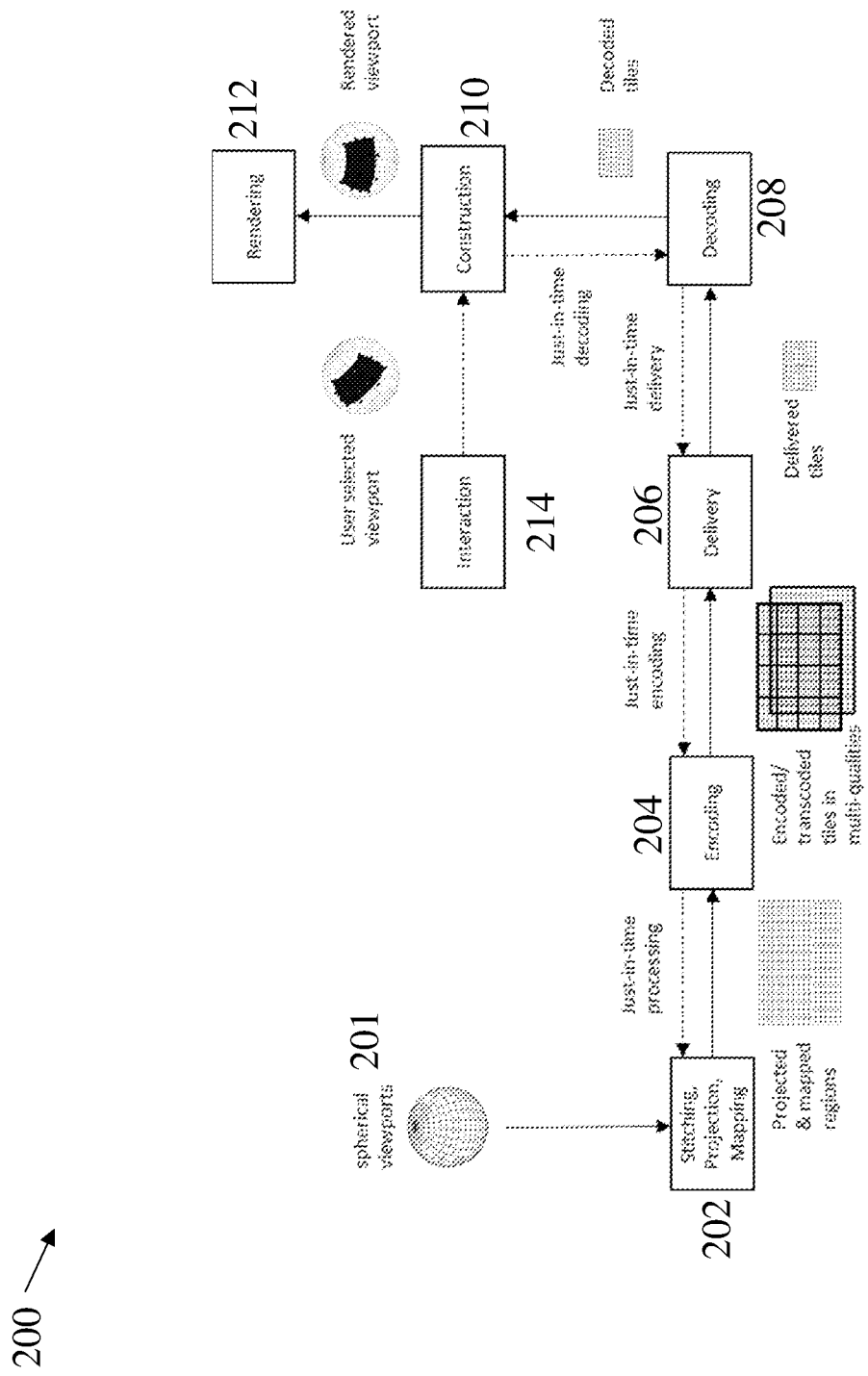
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
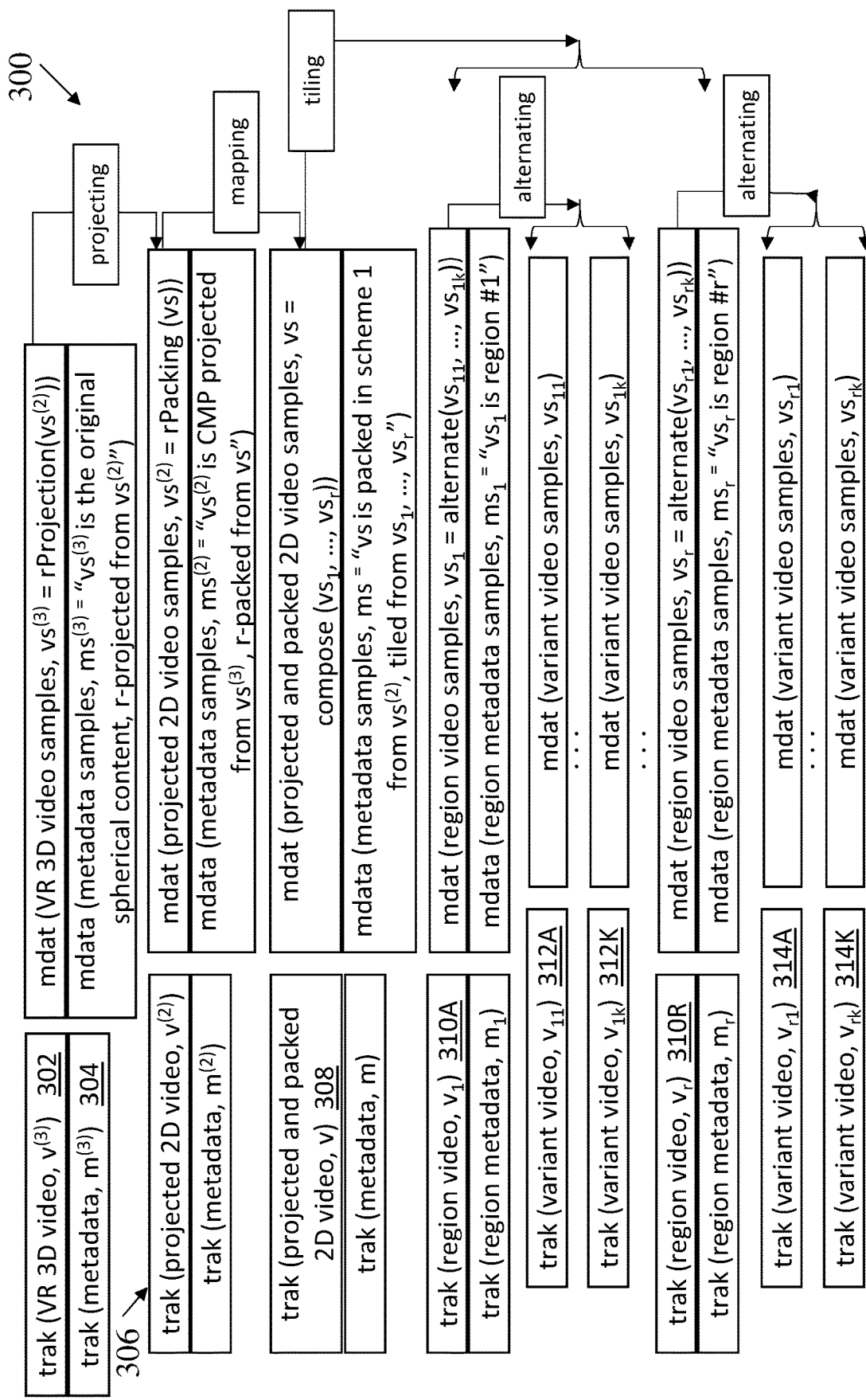
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118' meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, SK, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

Derived visual tracks can be used to specify a timed sequence of visual transformation operations that are to be applied to the input track(s) of the derivation operation. The input tracks can include, for example, tracks with still images and/or samples of timed sequences of images. In some embodiments, derived visual tracks can incorporate aspects provided in ISOBMFF, which is specified in w18855, "Text of ISO/IEC 14496-12 6$^{th}$ edition," October 2019, Geneva, CH, which is hereby incorporated by reference herein in its entirety. ISOBMFF can be used to provide, for example, a base media file design and a set of transformation operations. Exemplary transformation operations include, for example, Identity, Dissolve, Crop, Rotate, Mirror, Scaling, Region-of-interest, and Track Grid, as specified in w19428, "Revised text of ISO/IEC CD 23001-16 Derived visual tracks in the ISO base media file format," July 2020, Online, which is hereby incorporated by reference herein in its entirety. Some additional derivation transformation candidates are provided in the TuC w19450, "Technologies under Consideration on ISO/IEC 23001-16," July, 2020, Online, which is hereby incorporated by reference herein in its entirety, including composition and immersive media processing related transformation operations.

Figure 4:
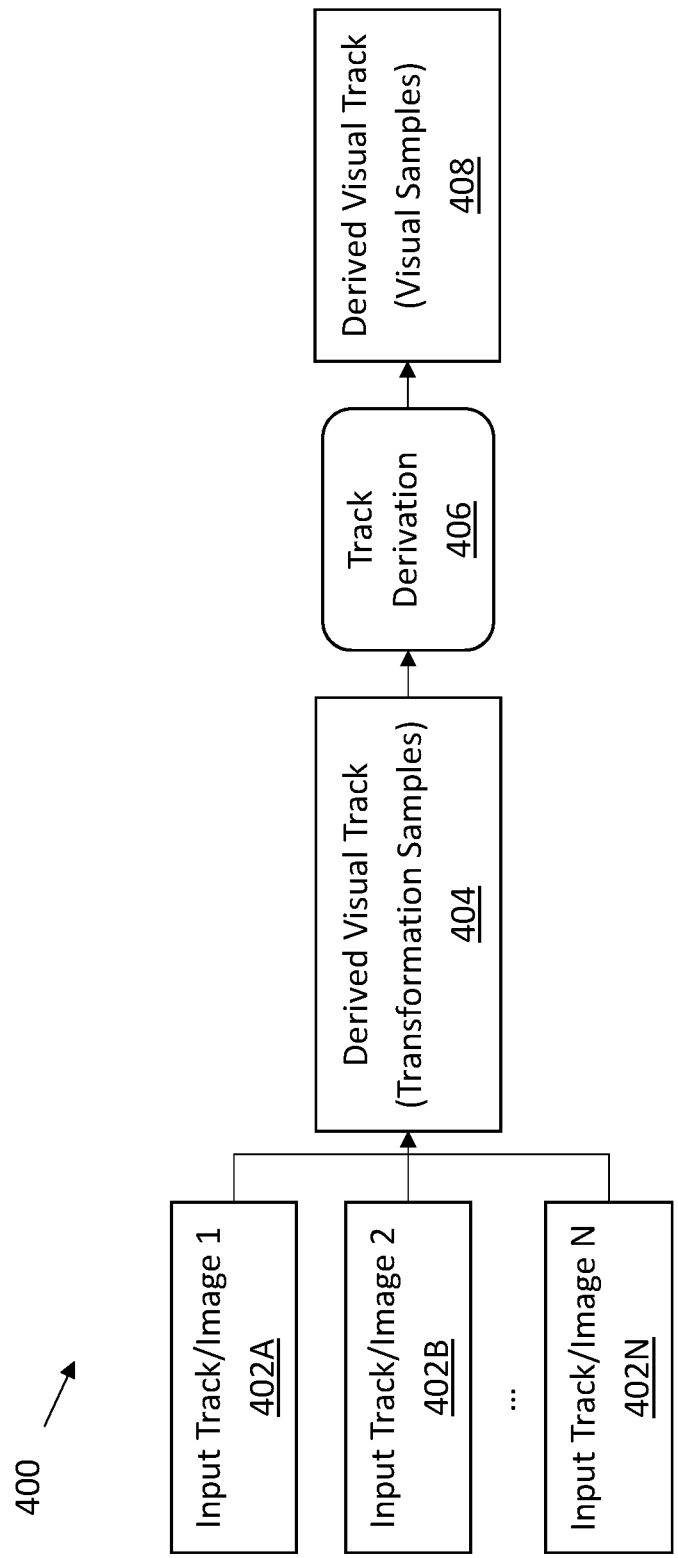
FIG. 4 shows an example of a track derivation operation, according to some examples.

FIG. 4 shows an example of a track derivation operation 400, according to some examples. A number of input tracks/images one (1) 402A, two (2) 402B through N 402N are input to a derived visual track 404, which carries transformation operations for the transformation samples. The track derivation operation 406 applies the transformation operations to the transformation samples of the derived visual track 404 to generate a derived visual track 408 that includes visual samples.

Figure 5:
FIG. 5 shows an exemplary syntax for a selection of only one transformation property, according to some examples.

Two track selection-based derivation transformations, namely "Selection of One" ('sell') and "Selection of Any" ('seln'), were proposed in m39971, "Deriving Composite Tracks in ISOBMFF," January 2017, Geneva, CH, which is hereby incorporated by reference herein in its entirety. However, both of these transformations were designed for the purpose of image composition of input tracks, and therefore require dimensional information for the composition operation. For example, FIG. 5 shows an exemplary syntax for a selection of only one ('sell') transformation property 500, according to some examples. The sell transformation property 500 includes reference_width 502 and reference_height 504 fields which give, respectively, the width and height of the reference rectangular space in which all coordinates (top_left_x 506, top_left_y 508, width 510 and height 512) are computed. These fields specify the size of the derived image that is composed of all input images of their corresponding input visual tracks. The fields top_left_x 506 and top_left_y 508 specify, respectively, the horizontal and vertical coordinate of the top-left corner of the rectangle region that the input media image of the corresponding track is to be placed. The fields width 510 and height 512 specify, respectively, the width and height of the rectangular region that the input media image of the corresponding track is to be placed. The sell transformation property can specify a reference width and height of a derived sample (reference_width 502 and reference_height 504, respectively) and place or compose one (e.g., and only one) input image from a same track selected throughout the transformation onto the derived sample at its corresponding location specified by top_left_x 506 and top_left_y 508 and with its corresponding size width 510 and height 512.

The inventors have appreciated problems with such selection approaches that are used for composition operations. For example, such transformation properties (e.g., like the sell and seln transformation properties) do not provide for specifying any selection criteria among input tracks. As another example, the placement parameters relocate and scale the selected image, which may not be needed or desirable. For example, it can be desirable to only select an image or samples from an input track without relocating and/or scaling the image or samples. As a result, the relocation and/or scaling operations add unneeded complexity and/or require providing unnecessary information. Further, such conventional approaches have not been adopted into practice, and therefore ISOBMFF does not include such transformation properties for use.

Track metadata can include information that specifies grouping information. For example, FIG. 6 shows an exemplary syntax for a track header box 600, according to some examples. As shown in this example, the track header box 600 can include, among various fields, an alternate_group 602 field. The alternate_group 602 can be an integer that specifies a group or collection of tracks. If the value is zero (0), then there is no information in the track header box 600 regarding possible relations to other tracks. If the field is not zero (0), then the value should be the same for tracks that contain alternate data for one another and different for tracks belonging to different such groups. An exemplary associated constraint is that only one track within an alternate group should be played or streamed at any one time, and shall be distinguishable from other tracks in the group via attributes such as bitrate, codec, language, packet size, etc.

Figure 7:
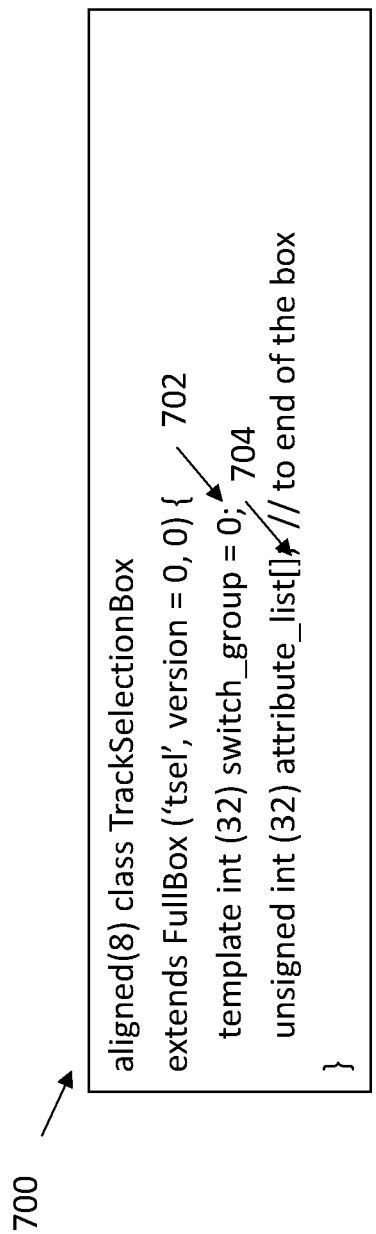
FIG. 7 shows an exemplary syntax of a track selection box, according to some examples.

Some track selection mechanisms can be used to select from groups of tracks. For example, FIG. 7 shows an exemplary syntax of a track selection box 700 that can be used with ISOBMFF, according to some examples. The track selection box 700 includes a switch_group 702 field that can be an integer value that specifies a group or collection of tracks. If the field is set to zero (0, the default value), or if the track selection box 700 is absent, there is no information on whether the track can be used for switching during playing or streaming. If the field is not set to zero (0), the field shall be the same for tracks that can be used for switching between each other. Tracks that belong to the same switch group shall belong to the same alternate group, and a switch group or alternate group can have only one member.

The attribute_list 704 field is a list that is composed of data that follows to the end of the box and lists attributes. The attributes in the list can be used as descriptions of tracks or differentiation criteria for tracks in the same alternate or switch group. Some attributes can be descriptive attributes that characterize the tracks that they modify. Exemplary descriptive attributes can include, for example, temporal scalability ('tesc') where the track can be temporally scaled, fine-grain SNR scalability ('fgsc') where the track can be scaled in terms of quality, coarse-grain SNR scalability ('cgsc') where the track can be scaled in terms of quality, spatial scalability ('spsc') where the track can be spatially scaled, region-of-interest scalability ('resc') where the track can be region-of-interest scaled, view scalability ('vwsc') where the track can be scaled in terms of number of views, and/or the like. Some attributes can be differentiating, and differentiate between tracks that belong to the same alternate or switch groups. A differentiating attribute can have a pointer that indicates the location of the information that differentiates the track from other tracks with the same attribute. Exemplary differentiating attributes can include, for example, such as codec ('codec') with a pointer to a sample entry (e.g., in SampleDescriptionBox of a media track), screen size ('scsz') with a pointer to width and height fields (e.g., of a VisualSampleEntry), max packet size ('mpsz') with a pointer to a Maxpacketsize field (e.g., in RtpHintSampleEntry), media type ('mtyp') with a pointer to a handler type (e.g., in a HandlerBox of a media track), media language ('mela') with a pointer to the language field in MediaHeaderBox, bitrate ('bitr') with a pointer to the total size of the samples in the track divided by the duration in the TrackHeaderBox, frame rate ('frar'), with the number of samples in the track divided by the duration in the TrackHeaderBox, number of views ('nvws') with a pointer to the number of views in the track, and/or the like.

A switch group can be a subset of tracks in an alternate group. For example, an alternate group can specify a set of video tracks, one of which can be played as described herein. A switch group can form a sub-group of the tracks in the alternate group, and can indicate how the tracks within the switch group switch (e.g., according to what parameters). Additionally, the track selection box can provide a number of attributes for selection. As a result, a number of parameters can be specified to help provide information on how the tracks are to be switched. For example, the codec attribute can be used to provide for selection based on different codecs. Another example is screen size, where the switch group can include different tracks for different screen sizes. Such attributes can be used, for example, for bitrate adaption.

Conventional approaches, such as a track section box as discussed in conjunction with FIG. 7, merely provide for signaling that a track belongs to a switch group of tracks (e.g., such that any member track of the switch group can be selected during playback or streaming). However, such conventional approaches do not provide for specifying or creating a new track that results from the selection or switching (e.g., a new track with a different track ID). Further, since conventional track selection or switching approaches are transient during playback or streaming, it is, for example, not possible to associate other tracks (e.g., metadata and/or audio tracks) to a selected or switched track.

The techniques described herein provide transformation operations for track derivation operations that can be used to perform track selection and track switching. The techniques described herein improve existing track derivation technology by providing for selecting samples from among multiple input tracks. As described further herein, since there can be a number of input tracks to a track derivation operation, a track selection derivation can select one of the input tracks at the sample level (e.g., not the track level) as the output track. Accordingly, the selection-based track derivation techniques described herein allow for the selection of samples of a track from a group of tracks at the time of derivation to generate a new track. The track derivation operations can provide flexibility in terms of the number of input tracks to the derivation operation. In some embodiments, the input tracks are a group of tracks. In some embodiments, just one input track is provided to the derivation operation, which is used to determine the associated group of tracks for the derivation operation.

An output track or the resulting media data of a derived track can include temporal sequences of contiguous video data samples. As described herein, the derived track can include a sequence of transformation properties that specify how to generate the samples for the derived track (e.g., where each transformation operation specifies how to generate an associated sample of the output track). In some embodiments, the selection-based track derivation techniques described herein can provide for an encapsulation of track samples (e.g., as the output from the derivation operation), where the track samples are selected or switched from a group of tracks as specified by the selection transformation properties. Such a track encapsulation is not provided for by conventional track selection mechanisms, such as those using track grouping mechanisms (e.g., alternate or switch groups, which switch at the track level and not the sample level). As a result, a track selection derivation operations described herein can provide samples from any of the input tracks to the derivation operation as specified by the transformations of the derived track. Further, the resulting derived track can be a new track. As a result, the techniques provide for associating other tracks (e.g., metadata and/or audio tracks) to the output derived track.

In some embodiments, grouping information can be used to indicate which set of tracks should be switched or selected from for a derivation operation. As described herein, the input tracks to the derivation operations can be grouped into alternate or switch groups. For example, the alternate or switch groups, respectively, can be implemented as described in clause 8.3.2, "track header box", and clause 8.10.3, "track selection box", in the latest ISOBMFF specification, such as discussed in conjunction with FIGS. 6-7, respectively. For example, alternate group features, such as those specified by alternate_group field in the track header box, can be used to indicate for a derivation operation an alternate group of one or more tracks. The derivation operation can select or switch to one track of the alternate group for the output track at a particular time (e.g., for play). As a result, if the input tracks are part of an alternate group, the derivation operation can select samples from only one of such input tracks for play at a time.

Such techniques can therefore provide for track switching and selection derivation operations that are not otherwise available with conventional approaches. In some embodiments, such a track encapsulation can allow for a straightforward association of metadata about a selected or switched track with the track encapsulation itself (e.g., by specifying the metadata in the derived track), rather than associating the metadata with a track group from which the track is selected or switched. For example, in order to specify that a track selected from a track group at run time has a region of interest (ROI), it becomes very easy and natural using the techniques described herein to signal the ROI for the derived track. For a static ROI, as one example, the ROI can be signaled in the derived track, such as in the metadata box (e.g., 'meta' box) of the derived track. For a dynamic ROI, as another example, a timed metadata track can reference the derived track, such as by using the reference type 'cdsc.' In contrast, with conventional techniques there is no direct way to signal such ROI metadata since it cannot be signaled in the derived track. For example, while a static ROI can be signaled in the metadata box of every track in an alternate or switch group using conventional techniques, such signaling incorrectly conveys that every track has the static ROI (rather than just a single track with samples selected from those tracks has the ROI). A similar problem occurs for dynamic ROIs: if a timed metadata track representing a dynamic ROI references an alternate or switch group, the existing track reference in the track reference box requires that the ROI applies to each track in the alternate or switched group. For example, sub-clause 8.3.3 in ISOBMFF states that, when it applies to referencing a track group, "the track reference applies to each track of the referenced track group individually." Similar to the static ROI case, such a track reference is not the desired functionality since the ROI does not apply to each track, rather it applies to the resulting (single) track of the derivation.

The track selection or switching techniques described herein can be used, for example, for applications that benefit from selective playback, adaptive streaming, and/or other various multimedia processing scenarios, such as those that require switching or selecting media samples from one or more tracks. In some embodiments, the track selection derivation techniques provided herein provide for a derived track encapsulation that enables the creation and execution of track-based media processing workflows. For example, the derived track encapsulation techniques can provide for in-network-based media processing (e.g., as described in w19062, "Text of ISO/IEC FDIS 23090-8 Network-based Media Processing," January 2020, Brussels, BE, which is incorporated by reference herein in its entirety) which can use derived tracks not just as outputs but also as intermediate inputs in the workflows.

In some embodiments, the derived track encapsulation allows track selection or track switching to be transparent to clients of dynamic adaptive streaming, such as DASH (e.g., as described in w19062), and carried out at corresponding servers or within distribution networks, for instance, implemented in conjunction SAND (e.g., as described in w18609, "Text of ISO/IEC FDIS 23009-1:2014 4th edition," July 2019, Gothenburg, SE, which is incorporated by reference herein in its entirety). Such an approach can, for example, simplify client logics and implementations with respect to shifting dynamic content adaptation from the streaming manifest level to the file format derived track level. This can be done, for example, based on an attribute list as described herein (e.g., with descriptive and differentiating attributes). For example, for adaptive streaming, a DASH manifest file includes an adaptation set that can have a number of representations that each correspond to one track, which allows a client to keep choosing segments from representations of an adaptation set with different qualities according to the client's capabilities in the network. However, such selection does not generate a new track. Rather, a client picks-up segments from a track and consumes the selected content, but does not produce output that results in another track. Further, the client is required to know the various available versions of content and to determine how to select the content. The client may also need to implement logic to request specific portions of the content. For example, if a client is consuming 360-degree content, the client will be viewing the content through a viewport. For 360-degree content, various tiles or portions of the content often need to be stitched and processed to generate the resulting viewport content, and therefore the client needs to choose which tiles need to be downloaded to cover the viewport (often requiring a client to request more content than is needed to cover the viewport), and perform the stitching and other steps to generate the ultimate viewport content. As a result, needing to support such processing at the client-side can be an issue, especially for light client devices.

In contrast, the techniques described herein can implement adaptive streaming at the track level rather than at the manifest level. As a result, the processing can be performed using the techniques described herein at either the client or server side (e.g., to achieve server-side adaptation instead of client-side adaptation). For example, the techniques described herein can eliminate the need for a client to pick-up or choose the representations and/or to perform subsequent processing to generate content (e.g., content for a viewport). Instead, the client can provide a set of parameters to the server (e.g., screen size/resolution, network bandwidth, etc.) to specify the content that can be supported by the client. On the server side, the server can take those parameters and apply the track selection operation to produce a segment for the client and send just that segment to the client.

Accordingly, the encapsulation techniques described herein can provide for eliminating the use of an Adaptation-Set and/or restricting its use to just containing a single Representation in DASH since the track selection can be performed outside of the DASH manifest file. With selection-based derived tracks, DASH clients (e.g., as described in w19062) and DASH aware network elements (DANE) (e.g., as specified in w18609) can simply provide values of attributes (e.g., codec 'cdec', screen size 'scsz', bitrate 'bitr', etc.) that are desired and/or required in the derived tracks, such that media origin servers and/or content delivery networks (CNDs) can provide content selection and switching from a group of available media tracks. As a result, the adaptation part of the logic can be moved from the client to the server, such that the client simply provides set-up parameters. Such a paradigm shift can significantly reduce the processing required by the client. In particular, for some clients, especially low-cost clients, it can be desirable to have the server construct the content for the client and to simply send a single stream to the client. Using such techniques, if a client is consuming 360 degree content, the client can simply request a viewport and receive exactly that content from the server. As another example, the techniques can be used for online gaming to provide for the sever to produce the content.

Additionally, the techniques described herein, including the derivation transformations, can also be used for other types of content other than video content. For example, the techniques described herein can be used to provide similar transformations for derived images and derived image items, such as those specified in ISO/IEC 23008-12, Image File Format, e.g., as provided in w16230, "Text of ISO/IEC FDIS 23009-5 Server and Network Assisted DASH," June 2016, Geneva, CH, which is hereby incorporated by reference herein in its entirety.

In some embodiments, the techniques provide for a transformation operation that can be used to select samples from input tracks and/or to switch between samples in the input tracks that are part of a same alternate group. The transformation operation can include an attribute list, and the attribute list values can be used to select samples from the input group of tracks.

In some examples, a new metadata box can be created, which will be referred to herein in one example as an alternate group selection (AlternateGroupSelection) derivation transformation, although it should be appreciated that this and other exemplary syntaxes and field names are for illustrative purposes only and are not intended to be limiting, since other naming conventions can be used instead with the techniques described herein. The AlternateGroupSelection derivation transformation can provide for the selection of one (e.g., and only one) sample from the available samples of the input tracks. In some embodiments, the input tracks are from a same alternate group. For example, the input tracks can have a same value (e.g., non-zero value) of the alternate_group field in their track headers. As an illustrative example, the track selection can be made at the time of track derivation according to the alternate_group field as provided in sub-clause 8.3.3, "Track header box" in the ISOBMFF specification.

In some embodiments, the sample selection can be specified according to a list of attributes provided in an attribute list, such as an array of values attribute_list[ ] that are specified in the transformation operation. Such attribute(s) can be used as descriptions and/or differentiation criteria for selecting one track from the input tracks with all the matched attributes. As an illustrative example, the attributes can be matched one by one (e.g., in the order of appearance in the attributes in the list). In some embodiments, the attribute list can be empty. When the list is empty, the derivation may not impose any additional restriction to the sample selection. In some embodiments, the attributes that are matched can be provided in the TrackSeletionBoxes of the tracks. Accordingly, in some embodiments, the attributes may (or may not) be a subset of the attributes in TrackSelectionBox of each input track.

In some embodiments, the alternate group selection transformation operation can extend the visual derivation base with an attribute list. FIG. 8 shows an exemplary syntax for the AlternateGroupSelection 800 transformation, according to some embodiments. In this example, the AlternateGroupSelection 800 transformation extends VisualDerivationBase ('atgs', flags) 802, and includes an unsigned int(32) array attribute_list[ ] 804. The attribute_list[ ] 804 is a list of description and differentiating attributes, as described herein. In some embodiments, the attribute_list[ ] 804 includes attributes such as those specified in sub-clause 8.10.3 in ISOBMFF. In some embodiments, the attribute_list[ ] 804 can be empty as described herein. If the attribute_list[ ] 804 is empty, the selection is among all the tracks within the switch group (e.g., since there are no attributes in the list that can be used as descriptive or differentiating ones for selecting a track out of the tracks in the group). In some embodiments, each entry is associated with a pointer to the field or information that distinguishes the track. The derivation operation can use the attributes to search for the appropriate track in the group of tracks. For example, if the attribute_list[ ] includes two attributes, codec and screen size (in that order), then the derivation operation can first search which tracks in the group meet the codec attribute, and then search among those tracks to see which one meets the screen size attribute. As described herein, the alternate group selection transformation can be carried in the derived track and specified at the granularity of each sample of the derived track and/or for a series of samples of the derived track.

In some embodiments, other groups of tracks can be the input to the track derivation operation instead of an alternate group of tracks. For example, the input tracks can be from a switch group, such that the derivation operation can select samples from a switch group of tracks. As an illustrative example, a switch group selection (e.g., SwitchGroupSelection) derivation transformation can provide for selection of one (e.g., and only one) sample from the samples of input tracks from a same switch group. For example, each of the input tracks can contain a track selection box (TrackSelectionBox) that each has a same value (e.g., non-zero value) of the switch_group field in the track selection box. In some examples, the selection can be made at the time of track derivation according to the TrackSelectionBox provided in sub-clause 8.10.3 "Track selection box" in ISOBMFF. In some embodiments, the selection from the switch group can be restricted according to a list of attributes (e.g., description and/or differentiating attributes) provided in an attribute list, such as a parameter array attribute_list[ ] that can be provided in the derivation transformation. As described herein, the attributes in the list can be used as descriptions and/or differentiation criteria for selecting one track from the input tracks.

Figure 9:
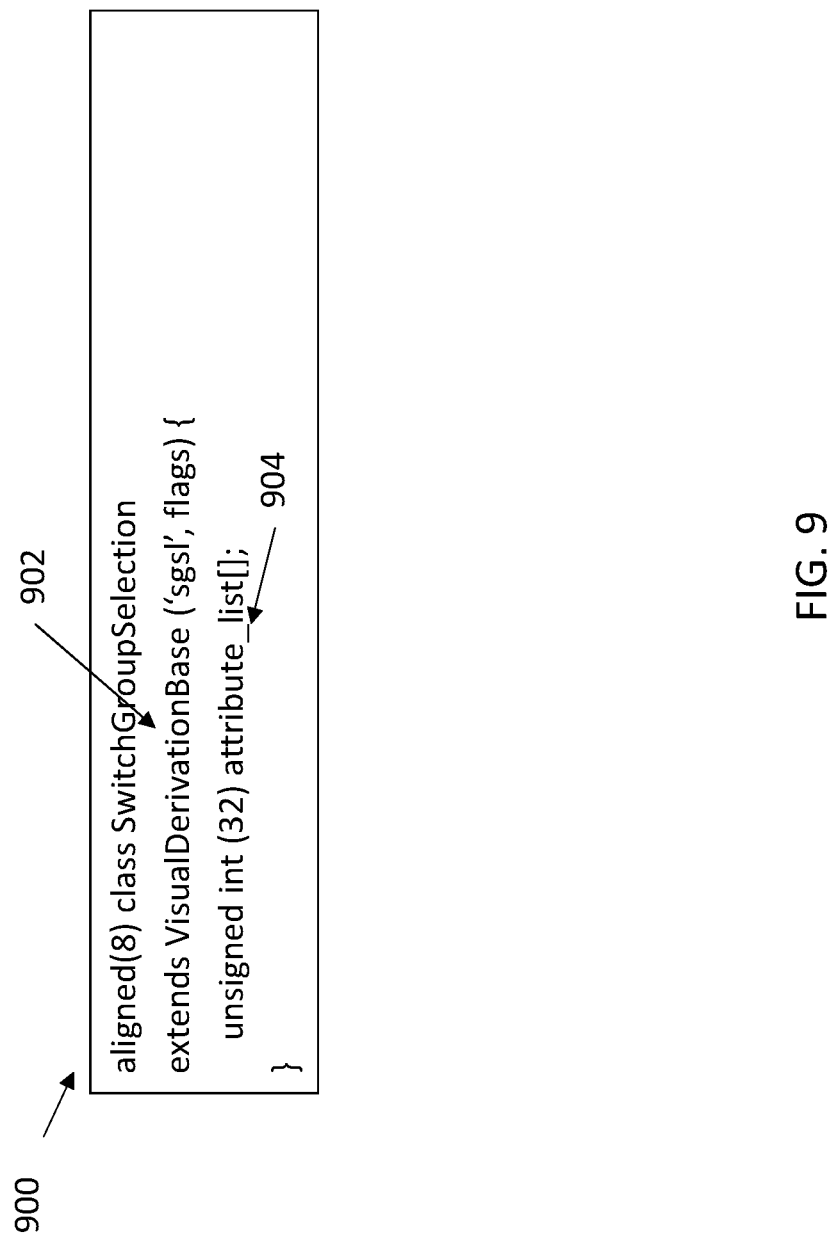
FIG. 9 shows an exemplary syntax for the switch group selection transformation property, according to some embodiments.

FIG. 9 shows an exemplary syntax for the SwitchGroupSelection 900 transformation, according to some embodiments. In this example, the SwitchGroupSelection 900 transformation extends VisualDerivationBase ('sgsl', flags) 902, and includes an unsigned int(32) array attribute_list[ ] 904. The attribute_list 904 can be, as described herein, a list of description and differentiating attributes (e.g., such as those defined in sub-clause 8.10.3 in ISOBMFF0). Similar to the AlternateGroupSelection 800 transformation in FIG. 9, the SwitchGroupSelection 900 can receive a group of tracks as an input, and apply the attribute_list 904 specified in the derived track and produce a sample output based on the attribute list. As described herein, the switch group selection transformation can be carried in the derived track and specified at the granularity of each sample of the derived track and/or for a series of samples of the derived track.

In some embodiments, the samples can be selected from input tracks at the client and/or server side of a client-server configuration, such as the encoding device 104 and decoding device 110 in FIG. 1. For example, in some embodiments the client (e.g., the decoding device) can perform the selection on received groups of tracks. As another example, the client can pass one or more parameters to the server (e.g., the encoding device 104 and/or a server storing encoded media) that instructs the server to provide the output of the derivation process to the client. For example, referring to FIGS. 2-3, the tracks can be composed according to a grid such that a grid composition places the input tracks according to a grid to decode the media content. As a result, the client and/or server just needs to process the attribute lists for the transformation samples in order to perform the grid composition operations.

In some embodiments, the techniques can be used with a single input track instead of a group of input tracks. As discussed herein, if a track is part of an alternate group, then the track will include an alternate_group value. Similarly, a track can include a switch_group value. In some embodiments, rather than including information that specifies the track group or switch group, the techniques can simply look at the alternate group value, and pick one track from that group. So with a single input track, the derivation process can perform the track selection by looking at the grouping information. Accordingly, some embodiments can provide for track derivations for track selection and switching with a single (representative) input track, rather than multiple input tracks.

In some embodiments, the selection can be performed from tracks of an alternate group. As an illustrative example, an alternate group selection transformation for one input track can be referred to for exemplary purposes as an AlternateGroupSelection1 derivation transformation, although this is not intended to be limiting. Such an AlternateGroupSelection1 derivation transformation can provide for selecting one sample from the samples of all tracks in an alternate group provided by the input track (e.g., the alternate group that the input track is in and/or represented by the input track). For example, the alternate group can be all of the tracks, if any, that have a same non-zero value of alternate_group as the input track in their track headers. In some embodiments, as described herein, the selection can be made at the time of track derivation according to the alternate_group provided in sub-clause 8.3.3, "Track header box", in ISOBMFF.

In some embodiments, the selection can be further restricted according to a list of attributes. For example, a list of attributes can be provided in the parameter attribute_list[ ] in the derivation transformation. These attributes can be used as descriptions or differentiation criteria for selecting one track from the tracks in the alternate group. The attributes can be matched one by one in the order of the appearance of the attributes in the list. In some embodiments, when the list is empty, the derivation imposes no additional restriction to the selection. In some embodiments, the attributes can be matched to attributes in the TrackSeletionBox of each track. Accordingly, the attributes may or may not be a subset of the attributes in TrackSeletionBox of each and every track in the alternate group.

FIG. 10 shows an exemplary syntax for the AlternateGroupSelection1 1000 transformation, according to some embodiments. In this example, the AlternateGroupSelection1 1000 transformation extends VisualDerivationBase ('atsl', flags) 1002, and includes an unsigned int(32) array attribute_list[ ] 1004. The attribute_list[ ] is a list of description and differentiating attributes as described herein, such as those specified in sub-clause 8.10.3 in ISOBMFF0. The derivation operation can use the attributes to search for the appropriate track in the group of tracks as described herein.

In some embodiments, the techniques can be provided for selecting from among tracks in a switch group. For an alternate group, the file format is restricted such that any track can only be in one alternate group. However, since a track can be in multiple switch groups, the switch group can be specified as part of the derivation operation. For example, since one track can be part of many switch groups, the techniques can indicate which switch group the derivation operation needs to look at for the selection.

In some embodiments, the SwitchGroupSelection1 derivation transformation provides a selection of one and only one sample from samples of tracks in a switch track group specified by the input track (e.g., the switch track group that the input track is in and/or represented by the input track). The switch track group can be identified by a non-zero value of the parameter switch_group specified in the derivation transformation. As a result, the tracks selected among for the derivation operation can include each track in the switch group, including the input track, that contains the same value of the parameter switch_group. For example, the switch_group can be specified by a track selection box TrackSeletionBox in each track. Accordingly, in some examples, the selection can be made at the time of track derivation according to the definition of TrackSeletionBox provided in sub-clause 8.10.3 "Track selection box" in ISOBMFF.

In some embodiments, the selection can be restricted according to a list of description and differentiating attributes provided in a parameter array attribute_list[ ] in the derivation transformation. These attributes can be used as descriptions or differentiation criteria for selecting one track from the switch track group with all the matched attributes. In some embodiments, as described herein, when the list is empty, the derivation imposes no additional restriction to the selection as described herein. For example, the derivation operation can include matching the attributes in the attribute_list[ ] to attributes in the TrackSeletionBox of each track. The attributes can be matched one by one in the order of the appearances of the attributes in the list, as described herein. Accordingly, the specified attributes may or may not be a subset of the attributes in TrackSeletionBox of each and every track in the switch track group.

FIG. 11 shows an exemplary syntax for the SwitchGroupSelection1 1100 transformation, according to some embodiments. In this example, the SwitchGroupSelection1 1100 transformation extends VisualDerivationBase ('sgs1', flags) 1102, and includes a template int(32) switch_group 1104 and an unsigned int(32) array attribute_list[ ] 1106. The switch_group 1104 can be a parameter whose semantics specify a switch group (e.g., as specified in sub-clause 8.10.3 in ISOBMFF) and has a non-zero value. The attribute_list 1106 can be, as described herein, a list of description and differentiating attributes (e.g., such as those defined in sub-clause 8.10.3 in ISOBMFF).

Figure 12:
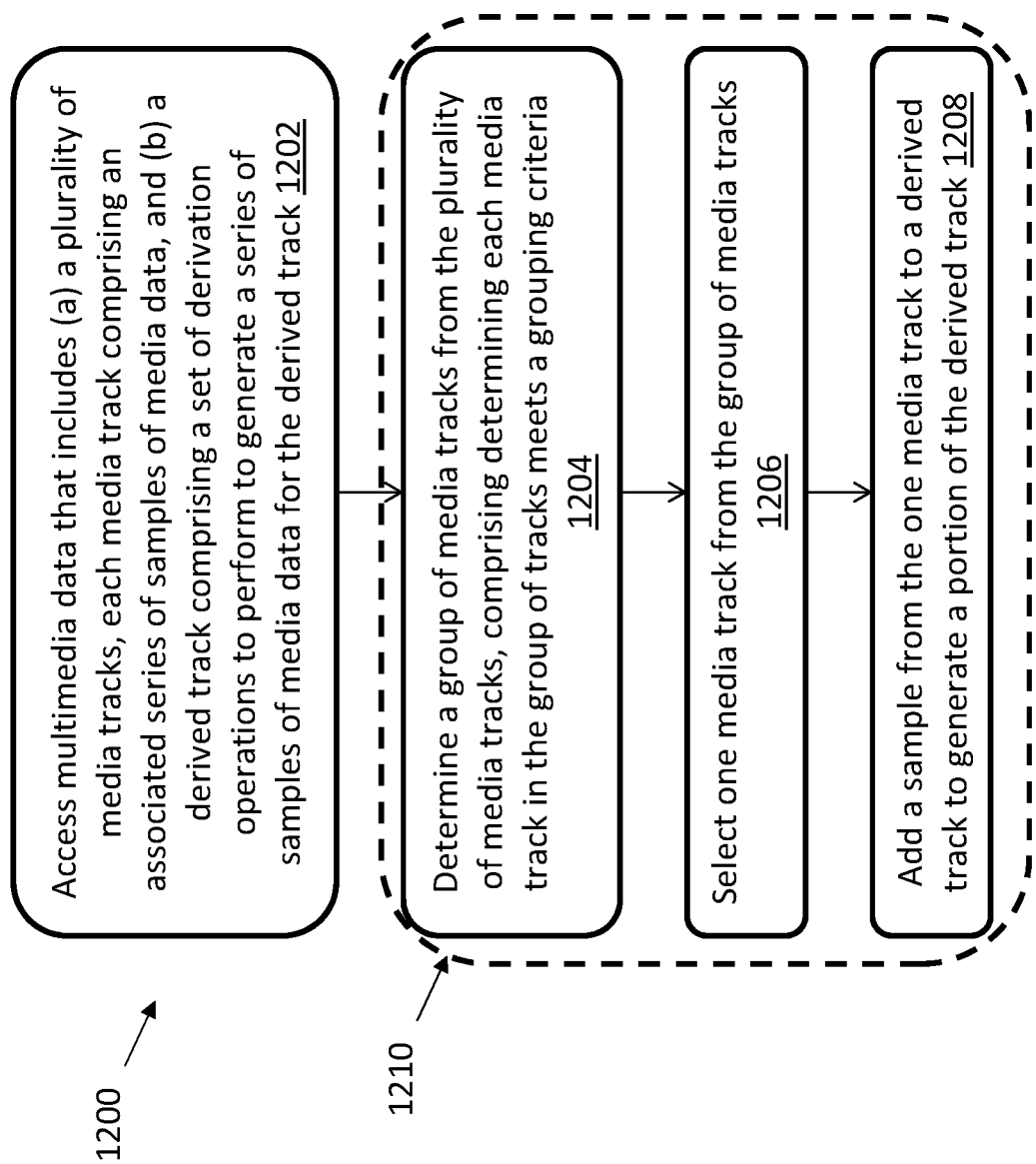
FIG. 12 shows an exemplary computerized method for a track derivation process for selecting or switching from among a group of tracks, according to some embodiments.

FIG. 12 shows an exemplary computerized method 1200 for a track derivation process for selecting or switching from among a group of tracks, according to some embodiments. At step 1202, the computing device (e.g., the encoding device 104 or the decoding device 110) accesses multimedia data that includes (a) a plurality of media tracks, each media track having an associated series of samples of media data, and a derived track that includes a set of derivation operations to perform to generate a series of samples of media data for the derived track. In some embodiments, some or all of the plurality of media tracks can be input tracks for a derivation operation, as described in steps 1204-1208, as indicated by the dotted box 1210.

At step 1204, the computing device determines, based on the derivation operation, a group of media tracks from the plurality of media tracks. The group of media tracks can be a subset of the plurality of media tracks. The computing device determines the group of tracks by determining that each media track in the group meets a grouping criteria. For example, in some embodiments the grouping criteria can be an alternate group value, and the computing device can determine that each media track in the group of tracks has an alternate group equal to the alternate group value. As another example, in some embodiments the grouping criteria can include a switch group value, and the computing device can determine each media track in the group of tracks has a switch group equal to the switch group value.

At step 1206, the computing device selects one media track from the group of media tracks. In some embodiments, the computing device selects the one media track from the group of media tracks based on an attribute list. For example, the computing device can determine, based on the derivation operation, an attribute list that includes one or more attributes. The computing device can select the one media track by determining the one media track meets each of the one or more attributes of the attribute list (e.g., while determining that the other tracks do not meet one or more of the attributes).

At step 1208, the computing device adds a sample from the selected one media track to the derived track to generate the sample for the portion of the derived track. The computing device can perform each derivation operation of the set of derivation operations to select media samples from the plurality of media tracks to generate the derived track with the selected media samples.

In some embodiments, as described herein a group of tracks (e.g., a group of alternate tracks and/or a switch group of tracks) can be the input to a derivation operation, and the portion of the derived track is the output of the derivation operation. In some embodiments, a single representative track can be an input to the derivation operation. In some embodiments, the representative track can be used to determine the grouping criteria (e.g., an alternate group of the representative track can be used to identify other tracks with the same alternate group and/or switch group). In some embodiments, the derivation operation can specify the grouping criteria (e.g., can specify the switch group, since the representative track may belong to multiple switch groups).

In some embodiments, the techniques can be performed by an encoder and/or a decoder. In some embodiments, the techniques can be used to generate an encoded bitstream according to the techniques described herein (e.g., which include a derived track(s) with track selection or switching derivation operations). In some embodiments, the techniques can be used to decode an encoded bitstream generated according to the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method implemented by at least one processor in communication with a memory, wherein the memory stores computer-readable instructions that, when executed by the at least one processor, cause the at least one processor to perform:

accessing multimedia data comprising:
   a plurality of media tracks, each media track comprising an associated series of samples of media data; and
   a derived track comprising a set of derivation operations to perform to generate a series of samples of media data for the derived track; and performing a derivation operation of the set of derivation operations to generate a portion of media data for the derived track, comprising:
   determining, based on the derivation operation, a group of media tracks from the plurality of media tracks, comprising determining each media track in the group of media tracks meets a grouping criteria, wherein the group of media tracks is a subset of the plurality of media tracks;
   selecting one media track from the group of media tracks, wherein selecting one media track from the group of media tracks comprises:
      determining, based on the derivation operation, an attribute list comprising one or more attributes; and
      selecting the one media track by determining the one media track meets each of the one or more attributes of the attribute list; and
   adding a sample from the one media track to the derived track to generate the portion of the derived track.

2. The method of claim 1, wherein:
the grouping criteria comprises an alternate group value; and
determining each media track in the group of media tracks meets the grouping criteria comprises determining each media track in the group of media tracks comprises an alternate group equal to the alternate group value.

3. The method of claim 1, wherein:
the grouping criteria comprises a switch group value; and
determining each media track in the group of media tracks meets the grouping criteria comprises determining each media track in the group of media tracks comprises a switch group equal to the switch group value.

4. The method of claim 1, wherein:
the group of media tracks are inputs to the derivation operation; and
the portion of the derived track is an output of the derivation operation.

5. The method of claim 1, wherein:
a representative track is an input to the derivation operation, wherein the representative track is used to determine the grouping criteria; and
the portion of the derived track is an output of the derivation operation.

6. The method of claim 1, wherein the at least one processor is further configured to perform each derivation operation of the set of derivation operations to select media samples from the plurality of media tracks to generate the derived track with the selected media samples.

7. An apparatus comprising a processor in communication with memory, the processor being configured to execute instructions stored in the memory that cause the processor to perform:
accessing multimedia data comprising:
a plurality of media tracks, each media track comprising an associated series of samples of media data; and
a derived track comprising a set of derivation operations to perform to generate a series of samples of media data for the derived track; and
performing a derivation operation of the set of derivation operations to generate a portion of media data for the derived track, comprising:
determining, based on the derivation operation, a group of media tracks from the plurality of media tracks, comprising determining each media track in the group of media tracks meets a grouping criteria, wherein the group of media tracks is a subset of the plurality of media tracks;
selecting one media track from the group of media tracks, wherein selecting one media track from the group of media tracks comprises:
determining, based on the derivation operation, an attribute list comprising one or more attributes; and
selecting the one media track by determining the one media track meets each of the one or more attributes of the attribute list; and
adding a sample from the one media track to the derived track to generate the portion of the derived track.

8. The apparatus of claim 7, wherein:
the grouping criteria comprises an alternate group value; and
determining each media track in the group of media tracks meets the grouping criteria comprises determining each media track in the group of media tracks comprises an alternate group equal to the alternate group value.

9. The apparatus of claim 7, wherein:
the grouping criteria comprises a switch group value; and
determining each media track in the group of media tracks meets the grouping criteria comprises determining each media track in the group of media tracks comprises a switch group equal to the switch group value.

10. The apparatus of claim 7, wherein:
the group of media tracks are inputs to the derivation operation; and
the portion of the derived track is an output of the derivation operation.

11. The apparatus of claim 7, wherein:
a representative track is an input to the derivation operation, wherein the representative track is used to determine the grouping criteria; and
the portion of the derived track is an output of the derivation operation.

12. The apparatus of claim 7, wherein the instructions cause the processor to perform each derivation operation of the set of derivation operations to select media samples from the plurality of media tracks to generate the derived track with the selected media samples.

13. An apparatus comprising a processor in communication with memory, the processor being configured to execute instructions stored in the memory that cause the processor to perform:
encoding multimedia data comprising:
a plurality of media tracks, each media track comprising an associated series of samples of media data; and
a derived track comprising a set of derivation operations to perform to generate a series of samples of media data for the derived track, wherein a derivation operation of the set of derivation operations provides for generating a portion of media data for the derived track by:
determining, based on the derivation operation, a group of media tracks from the plurality of media tracks, comprising determining each media track in the group of media tracks meets a grouping criteria, wherein the group of media tracks is a subset of the plurality of media tracks;
selecting one media track from the group of media tracks; and
adding a sample from the one media track to the derived track to generate the portion of the derived track, wherein:
the derivation operation comprises an attribute list comprising one or more attributes; and
selecting one media track from the group of media tracks comprises selecting the one media track by determining the one media track meets each of the one or more attributes of the attribute list.

14. The apparatus of claim 13, wherein:
the grouping criteria comprises an alternate group value; and
determining each media track in the group of media tracks meets the grouping criteria comprises determining each media track in the group of media tracks comprises an alternate group equal to the alternate group value.

15. The apparatus of claim 13, wherein:
the grouping criteria comprises a switch group value; and
determining each media track in the group of media tracks meets the grouping criteria comprises determining each media track in the group of media tracks comprises a switch group equal to the switch group value.

16. The apparatus of claim 13, wherein:
the group of media tracks are inputs to the derivation operation; and
the portion of the derived track is an output of the derivation operation.

17. The apparatus of claim 13, wherein:
a representative track is an input to the derivation operation, wherein the representative track is used to determine the grouping criteria; and
the portion of the derived track is an output of the derivation operation.

* * * * *